(No Model.)
W. S. ROWELL.
MEASURING AND DRAWING INSTRUMENT.
No. 535,223. Patented Mar. 5, 1895.
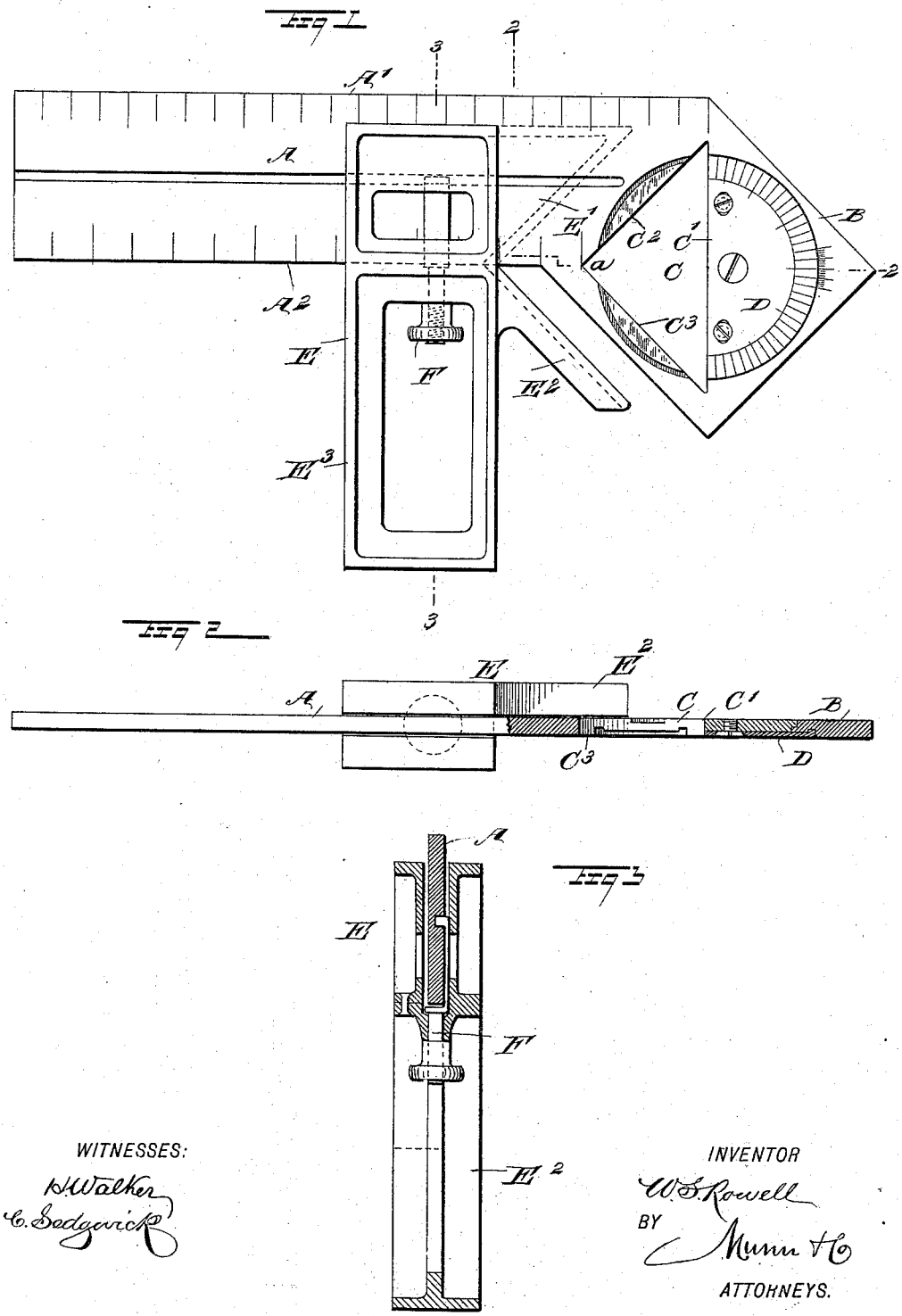
WITNESSES:
H. Walker
C. Sedgwick
INVENTOR
W. S. Rowell
BY
Munn & Co
ATTORNEYS.

UNITED STATES PATENT OFFICE.

WILLIAM S. ROWELL, OF MUNCIE, INDIANA.

MEASURING AND DRAWING INSTRUMENT.

SPECIFICATION forming part of Letters Patent No. 535,223, dated March 5, 1895.

Application filed March 5, 1894. Serial No. 502,398. (No model.)

*To all whom it may concern:*

Be it known that I, WILLIAM SHERMAN ROWELL, of Muncie, in the county of Delaware and State of Indiana, have invented a new and Improved Measuring and Drawing Instrument, of which the following is a full, clear, and exact description.

The invention consists principally of a blade having at one end a fixed head with a triangular opening, the base of which passes through the center of the head, and a centering head held adjustably on the said blade and having its arms parallel to the sides of the triangular opening.
The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a sectional plan view of the same on the line 2—2 of Fig. 1; and Fig. 3 is a transverse section of the same on the line 3—3 of Fig. 1.

The improved measuring and drawing instrument is provided with a blade A, formed at one end with a square head B, having a triangular opening C, the base C' of which extends through the center of the said square head B and is part of the transverse diagonal of the said square. The blade A has its outer drawing edge A', formed with a graduation in inches and sub-divisions, and the inner drawing edge $A^2$ of the said blade is formed with a graduation divided into units, which are to an inch as the diagonal is to the side of a square. This drawing edge $A^2$ is in alignment with the longitudinal diagonal of the square head B, standing at right angles to the other diagonal of which the base C' of the triangle forms part, that is, the sides of the square head form angles of forty-five degrees with the longitudinal axis of the blade.

The sides $C^2$ and $C^3$ of the triangular opening C have their apexes in alignment with the longitudinal diagonal of the square head B and with the edge $A^2$, it being understood that the side $C^3$ of the opening C is parallel to the adjacent side of the square head B.

The blade A is fitted to slide longitudinally in a centering head E, and is adapted to be fastened in place mounted to turn by a suitable clamping screw F, of any approved construction. The centering head E is provided with the usual arms E' and $E^2$, standing at right angles one to the other and parallel to the sides $C^2$, $C^3$, respectively, of the triangular opening C in the square head B. In said head opposite the opening C is arranged a protractor D, the base of which normally coincides with the base C' of the opening C. The head is provided on one side with an extension $E^3$ designed to serve in connection with the blade A as a square, &c.

In order to determine at what point the blade A is to be clamped in position on the centering head E in order to describe a square of a given diameter, I make use of the graduated edge $A^2$, the graduation of which is to an inch as the diagonal of a square is to the side. Now, in order to draw a one inch square in the center of a three inch circle cross the circle with two center lines something near at right angles to each other, adjust the instrument with the edge $A^2$ in line with either of the center lines and the apex of the angle *a* coincident with the center of the circle. Then while holding the centering head stationary, shift the blade A until the apex of the angle *a* is distant from the center one-half of one of the units of the edge $A^2$. Then draw lines along the sides $C^2$ and $C^3$, reverse the instrument to the opposite end of the same center line, again draw lines along the sides $C^2$ and $C^3$ and the square is complete.

To draw a hexagon, the short diameter of which is one inch, in the center of a two and a half inch square, cross the square with two center lines, that is, diagonals, adjust the instrument with the base C' one-half inch from the intersection of the center lines, that is, the center of the square, and with the edge $A^2$ in line with either. Then draw a line along the base C', reverse the instrument to the opposite end of the same center line, and then draw a line along the base C'. This will give the location of two sides of the hexagon. Now adjust the instrument to the other center line, with the center of the protractor in the center of the work; shift the base of the protractor thirty degrees from the base C' and draw a line along the base of the protractor. The points of intersection of the said line b' with the lines a' and a² respectively will determine one end of each of the said two sides of the hexagon. Then reverse the instrument to the opposite end of the same center line, and draw a line along the base of the protractor thereby obtaining the other ends of the said blade of the hexagon. Now extend the blades until the base of the protractor is in line with the end of one of the sides of the hexagon, draw a line along the base of the protractor, reverse the instrument to the opposite end of the same center line, and draw a line along the base of the protractor. Two additional sides of the hexagon are obtained in this manner. Then shift the base of the protractor thirty degrees from the base C' in an opposite direction and repeat the drawing and reversing, to form the remaining two sides of the hexagon.

It is understood that the blade may be inserted into the head E from the other side, thus making a centering blade without the head B in the way, and making an addition to the uses for the head B, viz: on plane surfaces bounded by a straight line or lines. The blade A and head B can be used as part of a bevel protractor.

From the foregoing it will be seen that the tool may be used for laying off any shaped figures inside the circumference of another figure, and the various uses are too numerous to be described in detail.

The instrument will aid the workman to very accurately draw the desired lines and figures on the work.

Having thus fully described my invention, I claim as new and desire to secure by Letters Patent—

1. The combination, with the centering head, of the blade fitted to slide therein, and the protractor mounted to turn in the sliding blade, substantially as described.

2. The combination, with the centering head, of the blade fitted to slide therein and provided with a head having a triangular opening one side of which is perpendicular to the direction in which the blade is adapted to slide, substantially as described.

3. A measuring and drawing instrument, comprising a blade having a square head with a triangular opening, the base of which coincides with one of the diagonals of the said square, and a centering head adjustably connected with the said blade and having its arms parallel to the sides of the triangular opening, substantially as shown and described.

4. A measuring and drawing instrument, comprising a blade having a square head whose sides form angles of forty-five degrees with the longitudinal axis of the blade, and a drawing edge provided with a graduation divided into units, each of which is to an inch as the diagonal is to the side of a square, substantially as shown and described.

5. A measuring and drawing instrument, comprising a blade having a square head, a drawing edge provided with a graduation divided into units, each of which is to an inch as the diagonal is to the side of a square, the said blade being also provided with a second drawing edge parallel to the first drawing edge, and having a graduation of inches and sub-divisions, substantially as shown and described.

6. A measuring and drawing instrument, comprising a blade having a square head, a drawing edge provided with a graduation divided into units, each of which is to an inch as the diagonal is to the side of a square, and a centering head adjustably connected with the said blade and having the apex of the angle formed by its arms situated upon the said drawing edge, substantially as shown and described.

7. A measuring and drawing instrument, comprising a blade having a square head, a drawing edge provided with a graduation divided into units, each of which is to an inch as the diagonal is to the side of a square, a centering head adjustably connected with the said blade and having the apex of the angle formed by its arms situated upon the said drawing edge, and a protractor held on the head of the blade and having its center in the center of the square head, substantially as shown and described.

WILLIAM S. ROWELL.

Witnesses:
DOLTON LARROWE,
F. C. SPRAELLING.